Jan. 13, 1959
S. J. HARVEY
2,868,537
SHOCK ABSORBER
Filed Sept. 27, 1955
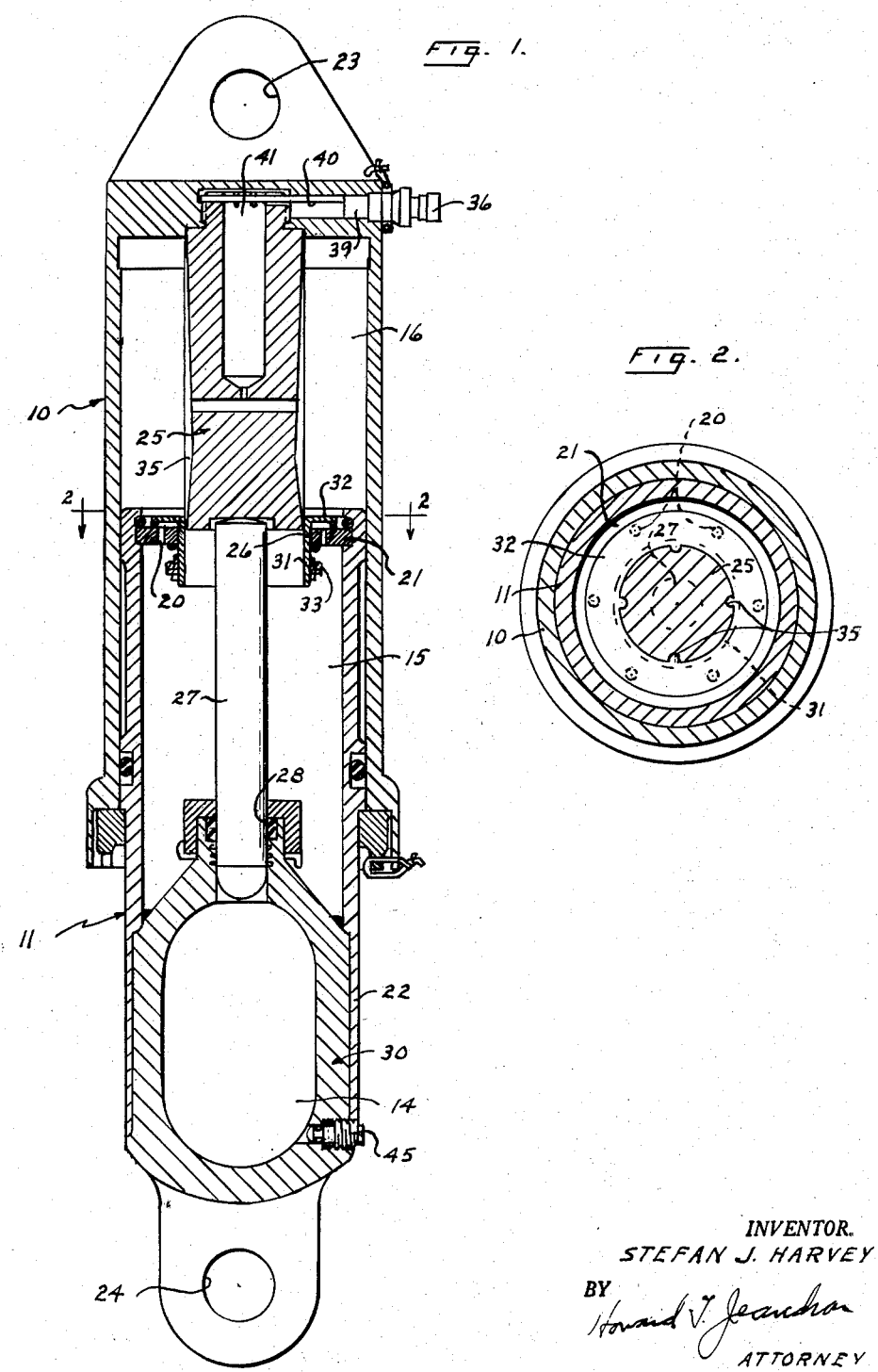
INVENTOR.
STEFAN J. HARVEY
BY
ATTORNEY

United States Patent Office 2,868,537
Patented Jan. 13, 1959

2,868,537
SHOCK ABSORBER

Stefan J. Harvey, Kingston, N. Y.

Application September 27, 1955, Serial No. 536,880

4 Claims. (Cl. 267—64)

This invention relates to hydraulic shock absorbers and more particularly to a telescoping shock absorber that is charged with hydraulic fluid and air under pressure.

It is an object of this invention to provide a hydraulic shock absorber which will react satisfactory to sudden heavy shock loads while also providing for resilient damping of smaller shocks.

A still further object of this invention is to provide a pair of telescoping tubular elements joined to form a hydraulic shock absorber in which one tube is provided with a sealed and filled shell of hydraulic fluid that is compressed by a ram or plunger that is in turn connected to the other tube.

A further object of this invention is to provide a pair of telescoping tubular elements constructed to form a hydraulic shock absorber in which a restricting valve is mounted between the chambers of each tube and in which the shambers are filled with a hydraulic fluid and a charge of compressed air to provide a dampening affect on the shock loads on the shock absorber.

Further objects of this invention shall be apparent by reference to the accompanying detailed description and the drawings in which Fig. 1 is a cross sectional view of the shock absorber and Fig. 2 is a cross sectional view taken on line 2—2 of Fig. 1.

According to the invention the hydraulic shock absorber comprises two cylinders capable of being telescoped one within the other and in which there are three chambers within the two tubular elements. The first chamber is filled with a compressible hydraulic fluid sealed against escape therefrom while the other two chambers contain hydraulic fluid and a charge of compressed air. The hydraulic fluid in these two chambers is separated by a partition wall having a plurality of orifices and said partition wall provided with a plate valve. One of the tubes is provided with a ram or plunger, the ram or plunger passing through the partition and entering the sealed chamber to compress the fluid therein with each shock load, the partition and orifices providing the means to dampen the ingress and egress of hydraulic fluid from one chamber to the other to take care of all minor shock loads.

In one construction of hydraulic shock absorber according to the invention, the two cylinders 10 and 11 are each provided at their outer closed end with a ring or eye 23 and 24 respectively by which the shock absorber is anchored to the relatively moveable parts of the machine or structure (not shown). The smaller or inner cylinder 11 telescopes within the outer or larger diameter cylinder 10 and closely fits the bore of the latter with the interposition of suitable glands or sealing rings to prevent escape of the hydraulic fluid during telescoping movement of such inner and outer cylinders. At the base end 22 of the inner cylinder 11 there is formed a shell 30 of an increased wall thickness to provide an axial chamber 14 filled with oil or other suitable hydraulic fluid. Above said walled chamber 14 and extending to the end of the inner cylinder 11, a second chamber 15 is formed which is normally closed by a disc-like partition wall 21 extending across the open end of the inner cylinder 11. The third chamber 16 is formed in the outer cylinder 10 and extends between the closed end thereof and the partition wall 21.

Projecting inwardly from the closed end of the outer cylinder 10 is a coaxially arranged ram or plunger 25 of substantial diameter which is guided at its inner end in a central bore 26 in the partition wall of the inner cylinder. Extending from the inner end of said ram 25 is a second and smaller diameter ram or plunger 27, formed as a reduced extension of the first plunger and projecting coaxially through the second chamber 15 and through a glanded bore 28 of the shell 30 attached to the base portion 22 of the inner cylinder 11. Interposed between the cylindrical bore 26 of the disc-like partition wall 21 of the inner cylinder 11 and the larger diameter ram or plunger 25 is a sleeve or bushing 31, an annular flange portion 32 of which is disposed in the third chamber 16 so that it overlies an annular series of holes 20 formed in the partition wall with which it forms a plate valve. The sleeve 31 is slightly elongated, with a stop band 33 around the outer periphery.

The plate valve performs in such a manner that the sleeve or bushing 31 is urged downward (Fig. 1) to a position in which its larger flange 32 is in contact with the partition wall 21 and closes the annular series of apertures 20 therein. The flange 32 is lifted with any increase in fluid pressure in chamber 15, such as during the compression stroke of the shock strut, thus the fluid will flow through aperture 20 into chamber 16. Formed in the outer cylindrical wall of the larger diameter ram or plunger 25 and extending substantially from end to end thereof are a plurality, for example three or four, of angularly spaced flutes 35 which are substantially U-shaped in cross-section, the depth of each flute progressively decreasing towards each end so that the cross-sectional area of the flute varies throughout its length, such cross-sectional area being greatest at or about the central portion of the flute.

As already stated, the first chamber 14 is filled with oil or other hydraulic fluid and is sealed to prevent escape of the fluid therefrom. The second chamber 15 is also filled with hydraulic fluid by charging the fluid through the check valve 36 while the third chamber is partially filled with hydraulic fluid and subsequently charged with air under pressure. The excess charge of fluid is then bled off by cocking the check valve 36, until the fluid level is at a predetermined level with the shock absorber extended. With the shock absorber in its fully extended state the application of a load thereto in order to cause the inner cylinder 11 to telescope in the outer cylinder 10 will cause the ram or plunger 25 to move relatively to the smaller diameter cylinder 11 so that the full diameter of portion 25 enters the second chamber while its smaller extension 27 enters the first or sealed chamber 14 and compresses the hydraulic fluid contained therein. Due to the ram or plunger 25 entering the second chamber it exerts pressure on the hydraulic fluid therein whereby the fluid flows upward through the apertures from the second chamber 15 into the third chamber 16 to give the required damping action after the initial shock has been absorbed by the compression of the hydraulic fluid in the first chamber 14.

Apart from the flow between the chambers 15 and 16 provided by the U-shaped flutes 35 in the outer periphery of the ram or plunger 25, this additional area of flow progressively increasing as the deeper portions of the flutes 35 pass inwardly through the sleeve or bush in the partition wall and then gradually decreasing as the shallower outer portions of the flutes pass through the sleeve or bush. The varying cross-sectional area of the flutes is arranged so that the varying additional flow area provided thereby imparts the desired characteristics to the shock absorber, namely, absorption of energy with maximum efficiency.

When the load is removed the shock absorber begins to extend due to the pressure of the fluid on the end of extension 27 in the first chamber 14 forcing it upward, also the increased or compressed air pressure in the third chamber 16 will act upon the hydraulic fluid returning same from the chamber 16 back into the chamber 15. When the fluid and air have been stabilized, the flange of the plate valve will have returned to its seating on partition 21 and the flow will be constrained to the varying cross-sectional area of the flutes 35 which additional area varies as the plunger or ram 25 returns to its initial position. Thus the damping effect progressively diminishes as the deeper, substantially central, portions of the flutes pass through the sleeve or bushing in the partition wall and is then increased as the shallower outer portions of the flutes pass therethrough, the return of the shock-absorber to its fully extended position becoming slower as it nears full extension.

A check valve 36 is provided in the outer end of the outer cylinder to permit filling of hydraulic fluid and injection of air into the shock absorber. Such check valve may comprise a spring-loaded ball arranged in the bore of a nipple 39 the inner end of which opens into an axial bore 40 of substantial diameter which forms a well extending inwardly to the outer end of the larger diameter portion 25 of the ram or plunger. This well is in turn connected to a central bore 41 in the ram 25. A cross bore is connected to the lower end of bore 41 and each end of the cross bore opens into one of the flutes 35 which are preferably diametrically opposed. These bores also furnish slight adidtional damping by providing escape channels of small cross-sectional area through which the fluid passes when the shock absorber approaches the fully closed position in which the sleeve or bushing has traversed the entire length of the flutes so that escape of the hydraulic fluid therethrough is prevented.

A further feature includes the addition of a thermal plug 45 to the wall of shell 30. With this plug any excess of pressure in shell 30, due to thermal expansion of fluid can be freely regulated. By turning the plug 45 in or out, the volume of the space 14 can be reduced or increased respectively, thus taking care of the differential thermal expansion between the shell 30 and the oil volume 14. Thus the pressure in space 14 is maintained at a predetermined value when the shock absorber is fully extended.

Although the shock absorber shown in Figs. 1 and 2 is specifically designed for a fluid and air combination to produce the desired charge pressure within the shock absorber, the shock absorber may be operated with a fluid charge under pressure only without departing from the spirit of this invention. Although the shock absorber is designed with two rams, the ram structure may be designed as a single unit without departing from the spirit of this invention. Although the shock absorber is divided into three chambers, the relationship of the chambers may be altered without departing from the spirit of this invention and this invention shall be limited only by the appended claims.

What is claimed is:

1. In a shock absorber for vehicles the combination of a pair of telescoping cylinders that are provided with an internal sealed relationship, a diaphragm across the end of the inner telescoping cylinder to form a fluid chamber on both sides thereof, a first ram attached to the inside of the outer telescoping cylinder and reciprocatable through the diaphragm and into the inner cylinder, a third chamber in the form of a sealed separate fluid container mounted at the outer end of said inner telescoping cylinder, said fluid container provided with an aperture at its upper end thereof, a second ram fitted through the aperture in said fluid container and extending to abut with the end of the first ram, said third chamber charged with oil when said second ram is fitted therein, a second aperture in said fluid container sealed with a plug, and means to charge the chambers on both sides of said diaphragm with a fluid and including means to retain air under a predetermined pressure into the chamber in said outer telescoping tubular element.

2. In a device according to claim 1 in which the first aperture is provided with a pressure seal surrounding said second ram to retain the fluid under pressure within said third chamber.

3. In a device according to claim 1 in which the plug in said second aperture may be turned in or out to increase or decrease the volume within said third chamber to compensate for differential thermal expansion.

4. In a shock absorber for vehicles, the combination of a pair of telescoping cylinders that are provided with an internal sealed relationship, first, second and third fluid pressure chambers within said telescoping cylinders, a pair of rams mounted to abut and be in alignment within the outer cylinder, a diaphragm across the end of the inner telescoping cylinder to form the first and second fluid pressure chambers on opposite sides, the fluid chambers being filled with fluid and the fluid being compressed by means of a first ram attached to the inside of the outer telescoping cylinder and reciprocatable through the diaphragm and into the inner cylinder, while the second ram is fitted through an aperture in the third chamber and extends to abut with the end of the first ram and compresses the fluid within the third chamber to provide a resilient cushioning of shock loads and means to restrict the flow of fluid from the second chamber to said first chamber.

References Cited in the file of this patent

UNITED STATES PATENTS

| | | |
|---|---|---|
| 1,700,044 | Hales | Jan. 22, 1929 |
| 2,333,096 | Dowty | Nov. 2, 1943 |
| 2,445,139 | Gret | July 13, 1948 |
| 2,469,912 | Bachman | May 10, 1949 |
| 2,554,807 | Bingham | May 29, 1951 |
| 2,559,967 | Katz | July 10, 1951 |
| 2,608,404 | Gruss | Aug. 26, 1952 |